Figure 14:
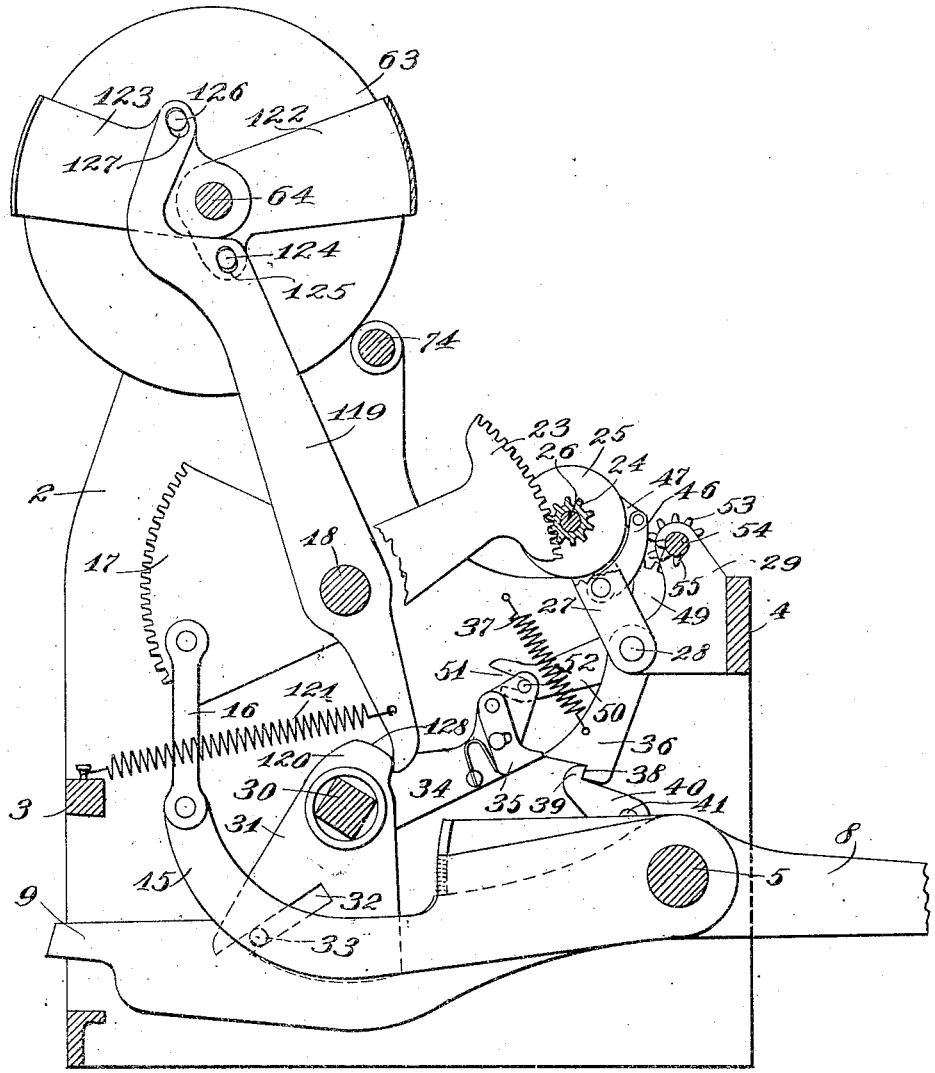

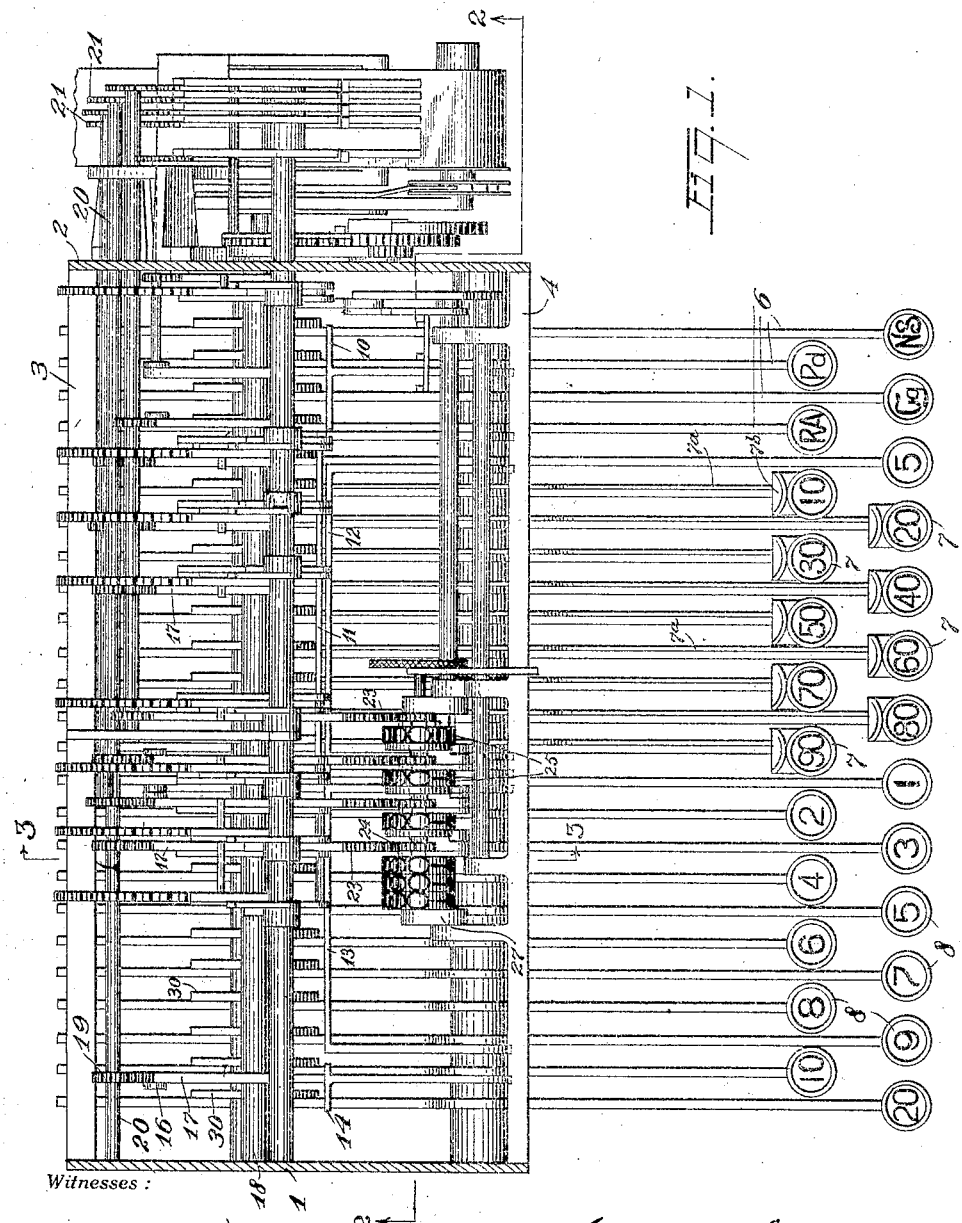

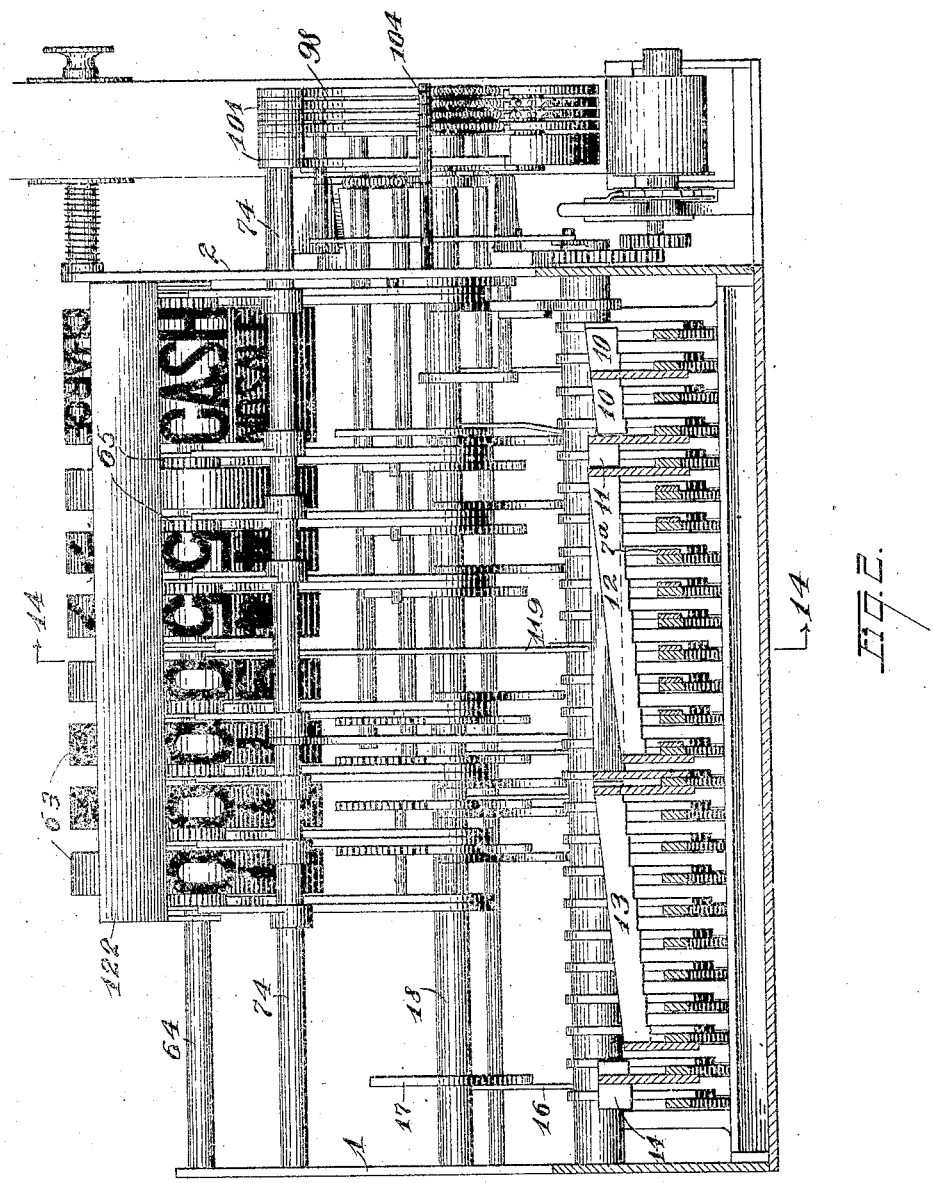

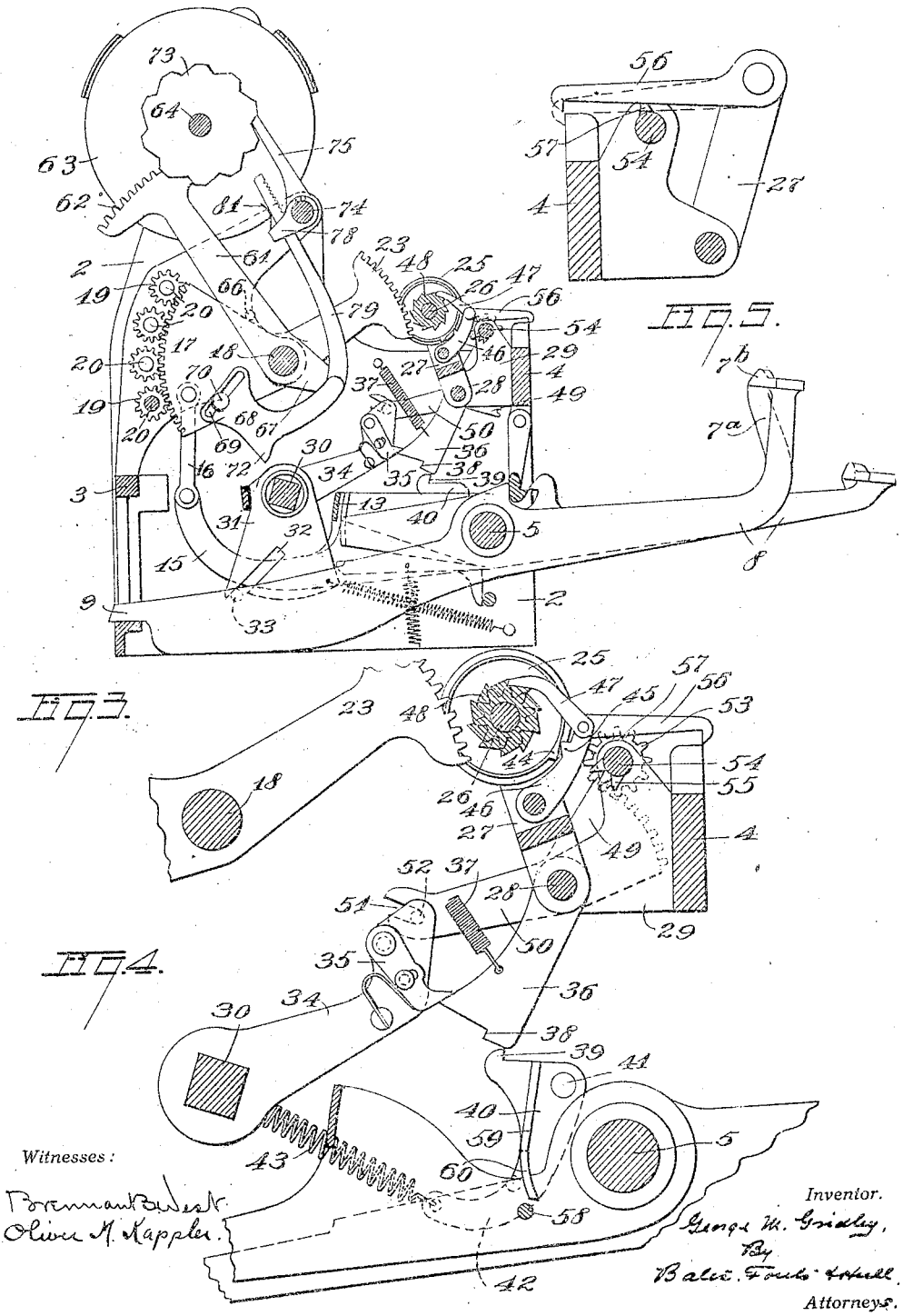

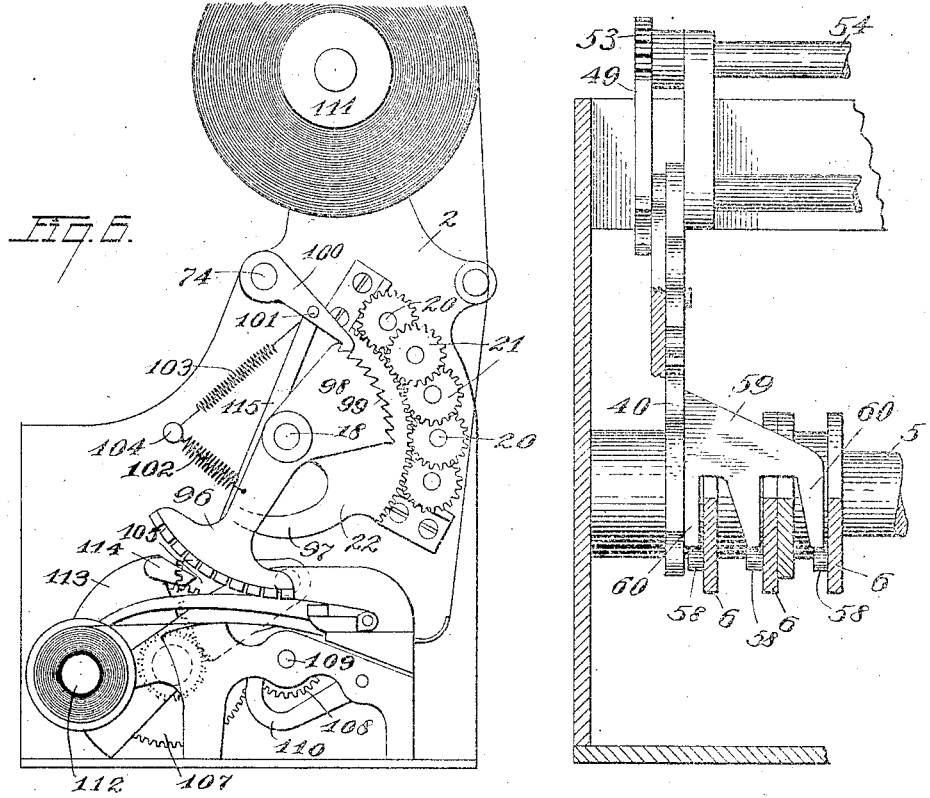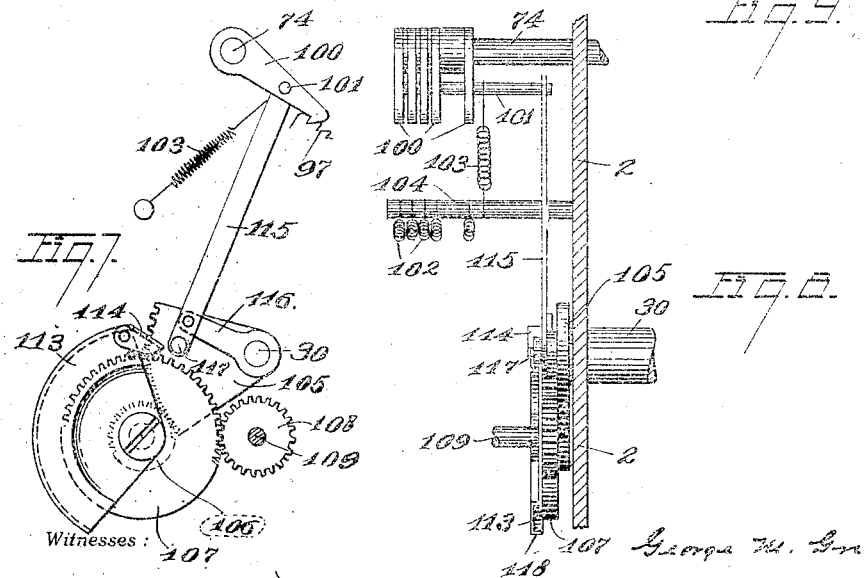

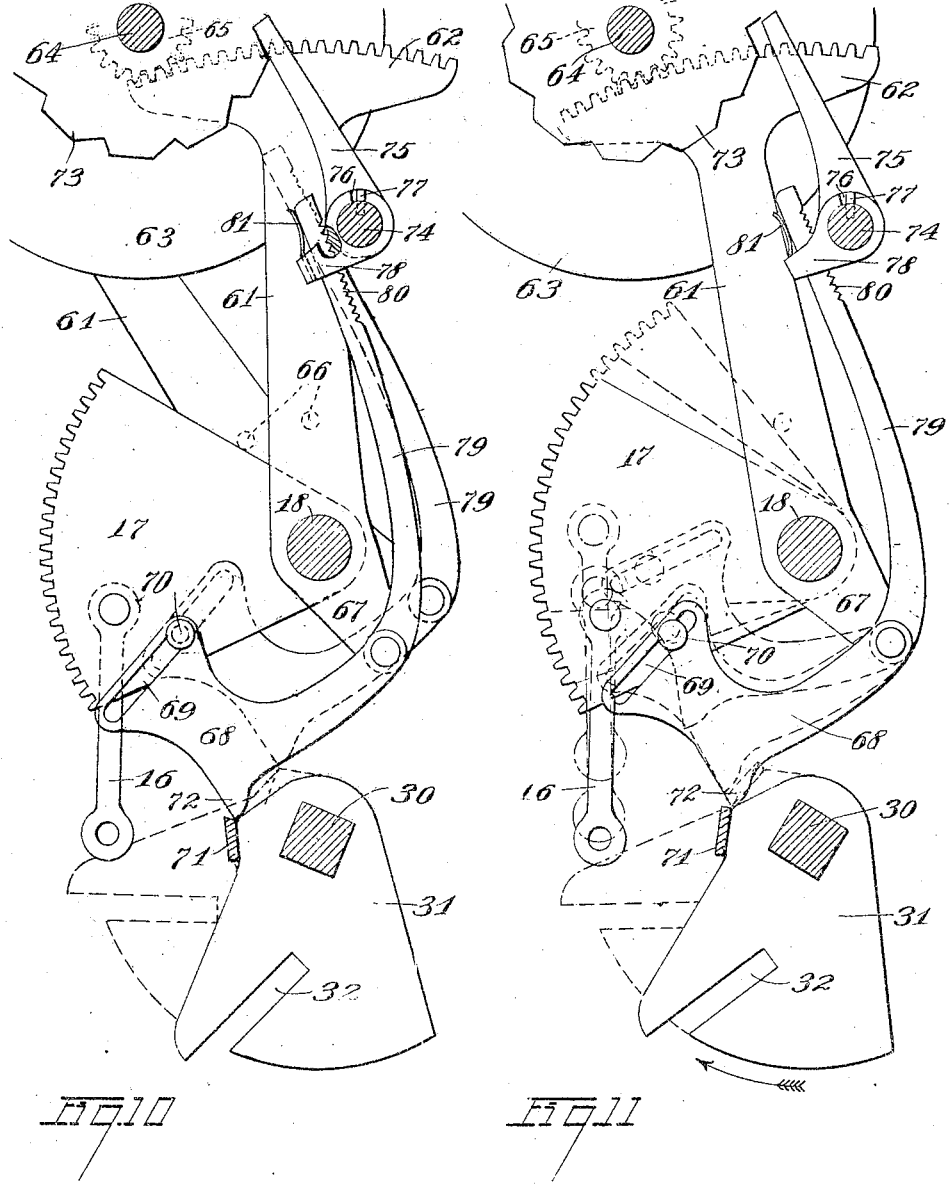

G. M. GRIDLEY.
CASH REGISTER.
APPLICATION FILED NOV. 6, 1909.
1,184,176.
Patented May 23, 1916.
7 SHEETS—SHEET 6.
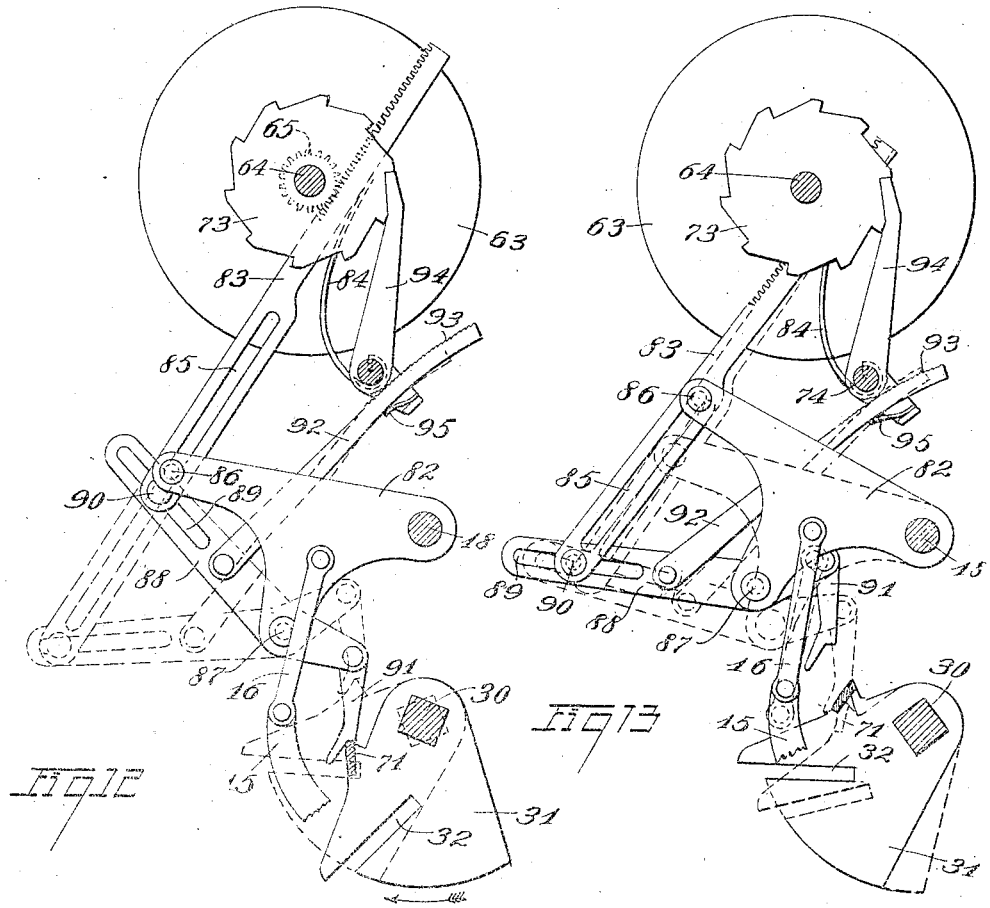

G. M. GRIDLEY.
CASH REGISTER.
APPLICATION FILED NOV. 6, 1909.

1,184,176.

Patented May 23, 1916.
7 SHEETS—SHEET 7.

Witnesses:

George M. Gridley, Inventor.

UNITED STATES PATENT OFFICE.

GEORGE M. GRIDLEY, OF COLUMBUS, OHIO, ASSIGNOR, BY MESNE ASSIGNMENTS, TO THE AMERICAN CASH REGISTER MANUFACTURING COMPANY, OF SAGINAW, MICHIGAN.

CASH-REGISTER.

1,184,176.  Specification of Letters Patent.  Patented May 23, 1916.

Application filed November 6, 1909. Serial No. 526,492.

*To all whom it may concern:*

Be it known that I, GEORGE M. GRIDLEY, a citizen of the United States, residing at Columbus, in the county of Franklin and State of Ohio, have invented a certain new and useful Improvement in Cash-Registers, of which the following is a full, clear, and exact description, reference being had to the accompanying drawings.

This invention relates to cash registers and, more particularly, to cash registers of the key lever type, the features of the cash register to which the invention especially applies being the means for setting the indicators to their indicating positions, the means for transferring from one adding wheel to the other and for locking the adding head in position during the transferring operation, and to the means for locking and releasing the type carriers of the recording device.

In cash registers employing rotary indicators, it is customary for the indicators to be left in their set positions between operations, the said wheels being returned to their zero positions at the beginning of the succeeding operation and, from the zero positions, moved forwardly into position for indicating the said succeeding transaction. This operation involves an excessive amount of movement of the indicator wheels; and, unless heavy springs are employed for returning the wheels to zero, insufficient time may be allowed for such return upon quick operations of the machine, such failure to return resulting in false indications.

In my invention, the indicator wheels are not returned to zero position at all, but are simply shifted from the position of the last indication into their new positions for disclosing the indication of the next transaction. This operation I effect by the use of positively operating means, thereby dispensing with the use of springs, which are always more or less uncertain in operation and liable to breakage.

Other features of the invention will be pointed out in the following specification which is descriptive of the particular embodiment of my invention shown in the accompanying drawings, in which—

Figure 1 is a sectional view taken horizontally through the machine below the indicator wheels; Fig. 2 is a sectional view taken vertically on the line 2—2 of Fig. 1; Fig. 3 is a vertical section taken transversely through the machine on the line 3—3 of Fig. 1 and looking toward the right; Fig. 4 is a section similar to that of Fig. 3 showing some of the parts enlarged and also showing the cut-out mechanism for the register; Fig. 5 is a detailed view of the locking device for holding the adding head during the transferring operation; Fig. 6 is a view of the right hand end of the machine showing the recording mechanism; Figs. 7 and 8 are side and edge elevations respectively of the mechanism for unlocking the type carriers; Fig. 9 is a view partly in section and partly in elevation of the cut-out mechanism for the adding device; Fig. 10 is a view partly in section and partly in elevation showing the indicator operating devices, one member of such devices being shown in the position for indicating "9", another member of said devices being shown in position for indicating "0"; Fig. 11 is a view similar to Fig. 10 showing in full lines the positions of the parts when the indicator wheel is moving from a higher to a lower indication, and also showing in dotted lines various other positions of the mechanism; Figs. 12 and 13 show side elevations of a modified form of indicator operating device, the parts being shown in different positions in the two views, and Fig. 14 is a view taken on the line 14—14 of Fig. 2 and showing the mechanism for operating the flash or shutter for the indicators.

Taking up a full description of the invention by the use of reference characters, 1 and 2 represent respectively the left hand and right hand frame pieces of the machine, the same being joined together at their rear by a cross plate 3 and at their front parts by a cross plate 4. Extending longitudinally through the machine and supported in the frame pieces 1 and 2 is a shaft or rod 5, upon which the key levers are pivoted. As appears from Figs. 1 and 3, these levers extend forwardly and rearwardly from the shaft, the forward ends being in two longitudinal rows, and said ends terminating in finger pieces upon which suitable characters are placed designating the character or value of the keys. The key levers which extend to the front row of finger pieces are carried forwardly in substantially a straight line, as shown in Fig. 3, while the levers carrying the rear row of finger pieces are turned upwardly, such arrangement enabling the key levers to be placed more closely together than would be possible if all of the finger pieces were in the same row. The four keys at the right hand end of the key board which are designated 6, are special keys, the same being intended to be operated only when some special transaction is made. The finger pieces for these keys are therefore provided with abbreviations of the words "Received on account", "Paid", "Charge", "No sale". The next ten keys to the left register cents, the same being designated by the reference character 7, the first one of these keys at the right being the five cent key, and the remainder the dimes keys. The remaining keys 8 at the left end of the key board are dollars keys. The key levers extend rearwardly from the shaft 5, and their rear ends 9 project into vertical slots in the plate 3, whereby the keys are guided.

Journaled upon the shaft or rod 5 is a series of yokes, there being a yoke for each of the several kinds of keys above referred to. Thus the keys 6 coöperate with a yoke 10, see Fig. 2; the five cent key coöperates with a yoke 11; the dimes keys 7 coöperate with a yoke 12; the first nine keys of the dollars series coöperate with a yoke 13, and the two left hand keys, which are tens of dollars keys, coöperate with a yoke 14. With the exception of the yoke 11 for the five cent key, the transverse bars of these yokes, which extend across the upper edges of the keys at the rear of the shaft 5, are provided with a series of steps, whereby varying amounts of lost motion are provided between the keys and their respective yokes. Thus, in the series of keys numbered 7, the ten cent key is adapted to move nine units of distance before it engages with its particular step on the yoke 12, while the ninety cent key moves but a single unit of distance before its engagement with said yoke. The purpose of the straight lower edge on the bar of the yoke 11 will be hereinafter set forth.

To each of the yokes there is connected a rearwardly extending arm 15, each of the same being connected through a link 16 with a toothed segment 17, said segments being journaled upon a transverse shaft 18 that is suitably supported in the end frames 1 and 2. These segments are, therefore, swung upon their common shaft 18 upon the depression of a key in the series corresponding thereto, and they will be rocked distances proportionate to the values of the keys operated. With each of the segments 17 meshes a pinion 19 on a shaft 20, said shaft extending parallel to the shaft 18 and through the right hand frame piece 2. There is one of these shafts and pinions for each of the segments 17, and, as stated, there is one of the said segments for the five cent key, one for the dimes keys, one for the dollars keys and one for the tens of dollars keys. The four shafts 20 are arranged in the arc of a circle about the shaft 18 so that the pinions thereon may all mesh with their respective segments. On the outer or right hand ends of these shafts, I place pinions 21, (Figs. 1 and 6) each of the same gearing with a toothed segment 22 that is journaled upon the extended end of the shaft 18. As the segments 17 are moved upwardly by the keys, and downwardly by gravity and spring pressure, as hereinafter described, the corresponding segments 22 are likewise rocked through the shafts 20 and their attached pinions 19 and 21. The function of the segments 22 will be hereinafter more fully set forth.

Suitably connected with each of the segments 17, and movable therewith on the shaft 18, are forwardly projecting gear segments 23. While the segments 17 are spaced on the shaft 18 as nearly as practicable in positions at the rear of the respective keys operating them, the segments 23 are arranged more compactly near the center of the machine, the segments being connected in any suitable manner, as by sleeves on their common shaft. The segments 23 are adapted to mesh with pinions 24, Fig. 14, which are connected to the adding wheels 25. These adding wheels are journaled on a shaft 26 that is carried in the upper end of a pivoted frame 27, said frame being pivoted on a rod 28 that is journaled in brackets 29 on the cross plate 4 of the machine frame. When a value key is depressed, its corresponding segments 17 and 23 are rocked distances corresponding to the value of the depressed key. At the beginning of the downward movement of the key frame 27 is swung rearwardly so as to throw the pinions 24 into mesh with the segments 23, and the further depression of the key, by turning the said segments, rotates the pinions 24 and the adding wheels connected thereto so as to cause the value of the depressed key to be added to the total then reading on said wheels. I shall now describe the mechanism for swinging the frame 27.

Journaled in the side frames 1 and 2 and projecting beyond the latter, is a squared or otherwise irregularly sectioned shaft 30, said shaft having secured thereto, alongside each of the keys, plates 31, the plates being provided with openings therethrough fitting the irregular section of the shaft 30 so that, when the plates are moved, the shaft must likewise move. In each of the plates 31 I form an upwardly and forwardly extending slot 32, and on each of the keys I place a pin 33, said pin being normally at the end of the corresponding slot 32, the plate 31 having an extended finger on one side of the slot which rests upon the pin of the corresponding key. The outer edges of the plates in front of the slots 33 are formed in the arc of a circle which is concentric with the shaft 30. When a key is depressed, its pin, engaging in the slot in the corresponding plate 31, turns the latter and also the shaft 30 with all the other plates thereon, with the result that the pin on the depressed key enters the slot 32 in its plate, while all the other pins on the other keys are locked against operation by reason of the fact that the concentric edges of the plates have been moved over said pins so that they cannot move upwardly. The shaft 30 with the series of plates 31 therefor, constitute a coupler and a key lock; for it will be understood that, if more than one key be started simultaneously, the pins of all of the started keys enter their respective slots and, thereafter, the operation of one of the started keys carries all of said started keys together throughout their strokes. This key coupler, therefore, is operated whenever a key is depressed, and it therefore becomes a convenient means for operating the swinging frame 27. For this purpose, I secure to the shaft 30, or to the coupler, a forwardly extending arm 34, said arm carrying a spring-pressed by-pass pawl 35, which pawl is pivoted to the arm and is in normal position for engagement with an arm 36 that depends from the frame 27 or from a part connected therewith. From its normal position, the coupler rotates toward the right, and the pawl 35 pushes the arm 36 forwardly and throws the adding wheel pinions 24 into mesh with their segments 23, as shown in Fig. 14. At substantially the same instant that the pinion 24 and segment 23 are brought into mesh, the pawl 35 passes beyond the arm 36, and the latter would be drawn backwardly by its spring 37 if means were not provided for holding the same temporarily against such movement. For this purpose, I provide the lower edge of the arm 36 with a notch or shoulder 38 with which a hook 39 on a rocking member 40 is adapted to engage, said member being pivoted at 41 and having a rearwardly extending arm 42 to which a spring 43 is connected for pressing the hook 39 toward the arm 36. Before the pawl 35 disengages the arm 36, the hook 39 has engaged the shoulder 38 and has thereby locked the arm 36 against movement, the pinions 24 being thus retained in engagement with the segments 23 while the latter are completing their movements. At substantially the end of the downward movement of the key and of the swinging movement of the arm 34 of the coupler, the latter engages the arm 42 of the member 40, thereby rocking said member and unhooking it from the arm 36, whereupon the spring 37 swings the frame 27 and the adding head or wheels forwardly and away from the segments 23.

On each of the adding wheels 25 for the five cents, the dimes, the dollars and the tens of dollars keys, I place a lug 44, each of the same being adapted, as its wheel rotates, to engage a lug 45 on a transfer lever 46 for that wheel, said levers being pivoted on a shaft that is carried in the frame 27. To the free end of each of the levers 46 I pivot a pawl 47, said pawl extending rearwardly into position for engaging the teeth of a ratchet wheel 48 on the adding wheel of the next higher denomination. As is common in machines of this kind, the characters on the adding wheels are adapted to be read through a slot in the casing, the drawings in the present application not showing any such casing. When one of these adding wheels 25 has once been turned until the figure 9 reads through the slot, any further movement imparted to it causes the cam lugs 44 and 45 for that wheel to press backwardly the corresponding transfer lever 46 until the pawl 47 drops behind a ratchet tooth of the next succeeding adding wheel. For returning the transfer levers to their normal positions and thereby rotating the said next succeeding adding wheel one space, I pivot on the shaft 28 a segment 49, said segment having a rearwardly extending arm 50 with a slot 51 therein into which projects a pin 52 on the arm 34 of the key-coupler. With the teeth of the segment 49 meshes a pinion 53 on the transfer shaft 54, said shaft being journaled in the brackets 29. On the shaft 54 and in front of each of the transfer levers 46, is a transfer lug 55, there being as many of these lugs as there are transfer levers, and the lugs being placed in different angular positions on the shaft so as to cause them to engage successively with their transfer levers. As the arm 34 swings with the coupler, the segment 49 likewise swings, and the shaft 54 rotates back and forth. While the frame 27 is held rearwardly during the down stroke of the key, the transfer levers 46 are out of reach of the lugs 55; but when the frame 27 is released and the adding head is thrown forwardly, the lugs 55 engage with the transfer levers 46 that have been pushed out of normal position during the transfer, and the said levers are thrown back again to their normal positions, thus completing the transfer.

The greater part of the mechanism that I have thus far described forms no part of my invention except in combination, and I have referred to the same in order to show the connection therewith of those parts of the machine shown which have been especially devised by me.

For the purpose of holding the frame 27 against rearward movement during the transfer operation, I pivot to the frame 27 a latch 56, said latch extending over the shaft 54 into position for engagement with the forward face of the plate 4 on the machine frame. On the shaft 54, and directly beneath the latch 56, I place a lug 57, the normal position of which is shown in Figs. 4 and 5, in which position the latch is held out of engagement with the said plate. The first part of the movement of a key moves the frame 27 sufficiently to carry the latch 56 out of engaging position before the shaft 54 turns to permit the latch to operate. When the arm 36 of the adding head frame 27 is released toward the end of the downward movement of the key, and the spring 37 throws the adding head forwardly, the shaft 54 is then in such position that the lug 57 permits the latch 56 to engage the said plate, and thus hold the adding head frame against rearward movement. The subsequent rotation of the shaft 54, and the pressure of the transfer lugs 55 on the levers 46 pushes said levers rearwardly to transfer, while the latch holds the frame securely against rearward movement, thus assuring the proper operation of the transfer mechanism.

The amount of cash in the cash drawer should always correspond to the amount shown on the registering wheels; and, for this reason, any transaction which does not change the amount of cash in the drawer should not operate the registering wheels. I have therefore devised mechanism for maintaining the register out of operation when such special transactions as "charge" or "paid out" are made, and I will now proceed to describe this mechanism, inviting attention especially to Figs. 4 and 9.

The operation of the latch member 40 upon the arm 36 for holding the adding head in operative position has already been described. If means be provided and put under control of the said special keys for preventing the engagement of said latch member with the said arm, the adding head will be thrown backwardly out of operative position before the adding segments 23 move. In my invention I have devised means for accomplishing the result last stated, the special keys each being provided with laterally projecting pins 58 which are normally just below and at the rear of a plate 59 on the member 40, said plate being provided with depending fingers 60. Upon the depression of any one of said special keys, its pin 58 moves upwardly into position for engagement by the said fingers, such engagement preventing the member 40 from rocking and latching the plate 36. By this construction, the by-pass pawl 35 on the arm 34 of the coupler simply moves the adding head into operative position temporarily, the said head being thrown backwardly out of such position as soon as the pawl 35 passes the arm 36, such operation taking place before the adding segments 23 are moved.

As has been stated, the five cent key coöperates with the yoke 11, which yoke when lifted by the depression of said key, turns the right hand or five cent wheel of the adding mechanism. It is inconvenient in the operation of these machines to depress both a dime key and the five cent key when odd multiples of five are to be registered; and, to obviate this inconvenience, I associate or mate with each of the dimes keys an auxiliary key 7ª, each of said auxiliary keys extending rearwardly below the said yoke 11 so as to operate the latter just as if the five cent key had been depressed. Each of the auxiliary keys is journaled on the shaft 5 alongside the dime key with which it is mated, and the finger piece 7ᵇ of the auxiliary key is placed just at the rear of the finger piece of the dimes key so that a depression of the auxiliary key results in the depression of the dimes key mated therewith. This depression of the two keys by the same operation results in adding the value of the dimes key on the second wheel of the adding mechanism and in adding five cents on the five cent wheel of said mechanism. This arrangement of dimes and auxiliary keys forms no part of my present invention and, as I make no claim for the same herein, it is believed that the description thus given is sufficient for this application.

I shall now take up the mechanism for operating the indicators, and shall first invite attention to that form of mechanism that is illustrated in Figs. 3, 10 and 11. It is my purpose to avoid the use of all springs and to reduce as far as possible the movement of the indicators; and, for this reason, I operate the indicators positively in both of their directions of movement, the backward movement being effected by mechanism under control of the key-coupler, and the forward movement being effected by mechanism under control of the graduated yokes and the segments 17. For moving the indicators, I journal on the shaft 18, adjacent the segments 17, indicator operating members 61, each of said members being provided at its upper end with a gear segment 62. The indicator wheels 63 are journaled on a shaft 64 that is suitably supported between the frame pieces 1 and 2, each of said wheels having secured thereto a pinion 65 with which the teeth on the corresponding segment 62 mesh. The members 61 are each provided with a laterally extending pin 66, said pins projecting over the upper edges of the corresponding segments 17 so as to be engaged by the latter. Upon the depression of a key of any denomination, the corresponding segment 17 is lifted or oscillated about the shaft 18 a distance proportional to the value of the key depressed. If the pin 66 corresponding to the segment operated be engaged by that segment, the member 61 will be swung with said segment a distance sufficient to cause the corresponding indicator to turn and indicate the value of the depressed key. Of course, springs or other devices may be added for quickly rotating the indicator wheels toward or to their zero positions, in which case the pins 66 would always be in, or would come to, a position for engagement by the segments 17; and, after such engagement, the indicator wheels would be rotated forwardly to their indicating positions. As stated, no springs or equivalent devices are used for turning the indicator wheels; and it therefore depends upon the conditions attending each transaction as to whether or not the segments 17 move the indicators forwardly. Thus, if the last indication were 8, and the next indication is to be 3, it is clear that the segment 17 would not rise far enough to engage the pin 66 if the latter remained stationary. If, on the other hand, the last indication was 3 and the next indication is to be 8, the segment 17 will engage the pin 66 and move it forwardly while the indicator wheel is turned through five units of distance, thus changing the indication from 3 to 8.

In the example first given, in which the indication is to be changed from 8 to 3, the indicator wheel must be turned backwardly; and, in the structure shown, this backward motion is positively effected until the indicator wheel is at "3," at which time the segment 17 begins its upward movement, finally coming to rest in engagement with the pin 66. For turning the indicator wheel from a higher to a lower indication, the lower end of each of the members 61 is extended, as shown at 67, and to the end of said extension I pivot what I shall term a resetting plate 68, said plate being preferably of the irregular shape shown in Figs. 3, 10 and 11. Projecting from each of the segments 17, and extending through an inclined slot 69 in the corresponding plate 68, is a pin or screw 70, said pin being adapted to play back and forth in the said slot. The resetting plates 68 are placed just above the key-coupler, and said coupler is provided with a bar 71 which is attached to the coupler plates 31 in position for engagement with depending noses 72 on the resetting plates 68. Of course, lugs on those coupler plates 31 that lie in the planes of the resetting plates may be substituted for the bar 71.

Each of the indicator wheels 63 is provided with a notched disk 73, there being as many notches as there are indicating characters or sets of characters on the corresponding indicator wheel. On a rod 74, which extends parallel to the rods or shafts 18 and 64, I pivot a series of detent pawls 75, there being as many of these pawls as there are disks 73. These pawls coöperate with the disks and, when engaging in the notches on the latter, prevent the backward rotation of the indicator wheels. The pawls are permitted a limited oscillatory movement on the rod 74 by slotting their hubs at 76, into which slots extend pins 77 from the rod 74, the slots being of sufficient length to permit the pawls to vibrate slightly. Each of the pawls 75 is also provided with a short arm 78, the said arms being hollow, or in the form of a loop, through each of which extends a bar 79. Each of the bars is provided near its upper end with a series of serrations or teeth 80, which teeth are adapted to engage with corresponding teeth on the hubs of the pawls 75. The teeth 80 are held in engagement with the hubs of the pawls by springs 81 which are mounted on the arms 78 so as to engage with the back edges of the bars 79. The openings through the arm 78 are made large enough to permit the bars to spring backwardly as the teeth 80 trip over the teeth on the pawl hubs. The bars 79 are pivoted to the extensions 67 of the members 61 coincident with the pivots of the resetting plates 68.

In Fig. 10 I have shown the indicator wheel 63 in position for indicating 9. The indicator beyond, which is not shown, is in position for indicating zero, as the pin 66 on the member 61 for operating that indicator is shown as being already in position for engagement with its operating segment 17. Assuming that the indicator wheel 63, as shown in said figure, is now to be turned from 9 to 3, the first movement of the key-coupler causes the bar 71 thereon to push on the nose 72 of the resetting plate 68, and to thus rock the member 61 rearwardly. At the very beginning of this movement, the bar 79 connected with said member is lifted so as to push the detent pawls 75 out of engagement with the ratchet disk 73 for the indicator wheel.

As will be seen from an inspection of Figs. 10 and 11, the sides of the notches in the ratchet wheels 73 form angles that are greater than right angles, the sides of the notches against which bear the ends of the pawls 75 being so shaped that any force tending to rotate the indicator wheels backwardly also tends to cam the pawls out of the notches. At the beginning of the resetting movement, therefore, the force tending to set the indicator wheels backwardly tends to cam the pawls outwardly, which latter tendency is supplemented by the force exerted directly on the pawls by their bars 79, the result being that the indicators become unlocked and are maintained in unlocked condition during this resetting movement.

The continued movement of the key-coupler results in pushing the member 61 rearwardly and in thus rotating the indicator wheel toward its lower indication, the resetting plate 68 being shoved forwardly and the pin 70 of the segment 17 moving in the slot 69 of said plate. When the member 61 has been moved until the indicator shows "3," the key number 3, which is being operated, engages its graduated yokes, thereby, lifting the yoke and the segment 17 which corresponds to the resetting plate that has been operated. This rocking movement of the segment lifts the resetting plate until the nose 72 is withdrawn from contact with the bar 71, such withdrawing action taking place and being completed within a unit of movement of the segment, or within such movement as results in turning the indicator one-ninth of its complete movement. As soon as the resetting plate is disengaged from the coupler, the indicator wheel comes to rest in position for indicating "3," or approximately in that position, as the indicator may have been turned slightly beyond that point, especially in case of a rapid operation of the machine, and the pawl 75 is free to engage the notched disk 73. The continued depression of key number 3 lifts its segment 17 until it engages with the pin 66 on the member 61, such engagement forcing the member forwardly into its correct position and thus returning the indicator to position for indicating "3," if it has been moved beyond that point.

If the indicator be left in position for indicating "3," the nose 72 of the resetting plate occupies such a position that the bar 71 on the coupler must move three units of its oscillation before there is any engagement between these parts. If, then, the next indication is to be "8," the depression of the number 8 key begins to lift the segment 17 before such engagement takes place, with the result that the resetting plate is lifted until the nose 72 is out of engaging position with respect to said bar and the indicator wheel is not turned backwardly; but, the segment, by engaging the pin 66, pushes the member 61 forwardly and turns the indicator into position for indicating 8. In turning from the lower to the higher indication, the notch plate 73 simply moves under the detent pawl 75, said pawl snapping into the notches of the plate without interfering with the forward movement of the indicator.

From this description it will be understood that, when the indicator wheel is to be moved from a higher to a lower indication, the coupler automatically releases the detent pawl 75 and positively forces the indicator backwardly, such movement continuing until the segment 17 for that indicator wheel begins to be lifted, at which time the indicator wheel has been brought to approximately its proper position. The segment 17 continues its movement, however, until it engages the pin 66 on the member 61, which forces the indicator back into proper position if it should have been slightly overthrown. Also, when the indicator is to be operated from a lower to a higher indication, the detent pawls are not operated from the coupler and the indicator wheels are not moved backwardly, but the resetting plate is lifted by the movement of the segment 17 out of engaging position with respect to the coupler, and the engagement of the segment 17 with the pin 66 positively drives the indicator wheel forwardly into indicating position.

In Fig. 11 I have shown in full lines the mechanism just described in the position it assumes substantially at the completion of the operation of turning the indicator from a higher to a lower position, as from 9 to 8, the detent pawls 75 still being held out of engagement with the notched disk 73, the resetting plate 68 being lifted slightly, as appears by the position of the pins 70 in the slot 69, but the nose 72 still being engaged by the bar 71. In the same figure, the lower set of dotted lines shows the position of the segment and the resetting plate just after the segment has begun its oscillation, the resetting plate then being lifted until its nose 72 is out of engaging position with respect to the bar 71. In the upper set of dotted lines, the segment 17 and the resetting plate are shown in their final position. From this figure, it will be seen that the member 61 has not been moved while the segment 17 has moved from its full line to its upper dotted line positions. By the mechanism thus described, therefore, the indicator wheel is moved positively in both directions, and it is given only such an extent of movement as will suffice to bring the indicator wheel from the position of its last indication into position for the new indication.

In Figs. 12 and 13 I have shown a somewhat modified construction of the mechanism just described, in which figures the parts which are common to the corresponding parts of Figs. 10 and 11 are given the same reference characters. In this form, the links 16 are connected to plates 82 which are pivoted on the rod 18 in the places of the operating segments 17, and the indicator wheels are turned by rack bars 83 instead of by the segments 62, said rack bars being held in engaging position with the pinions 65 by springs 84. Each of the rack bars 83 is provided with a slot 85 near its lower end into which projects a pin or screw 86 on the corresponding plate 82. Pivoted on a depending arm of the plate 82 at a point 87 is a lever 88, said lever having a slot 89 near its rear end. The rack bar 83 corresponding to the plate 82 and the lever 88 is provided with a pin or screw 90 which extends into the slot 89 of said lever. On the forward end of the lever 88, I pivot a depending pawl 91, said pawl being adapted to engage with the bar 71 on the key-coupler. Also pivoted to the lever 88 between its pivot point 87 and the slot 89 is a ratchet bar 92, said bar having ratchet teeth 93 that engage with ratchet teeth on the hub of the detent pawl 94, said pawl engaging with the notched disk 73 of the indicator wheel. The bar 93 is held in engagement with the said hub by a spring 95 that operates in the same manner as the spring 81 in the form previously described.

In Fig. 12 the indicator wheel 63 is shown in position for indicating a high value, as "9". If it be desired to indicate at the next operation a low number, say "3", the first movement of the coupler causes the bar 71 thereon to lift the pawl 91 and to swing the lever 88 on its pivot 87. The first part of this swinging movement disengages the pawl 94 from the notched disk 73, and the lever draws downwardly the rack bar 83, thus turning the indicating wheel toward zero. At substantially that instant when the indicator wheel shows "3", the key engages its graduated yoke and lifts the plate 82 through the link 16, such lifting action carrying the pivot 87 of the lever 88 upwardly and lifting the pawl 91 out of engagement with the bar on the key-coupler. As the key continues its downward movement, the plate 82 continues its upward movement until the pin 86 on the plate reaches the upper end of the slot 85. If the indicator wheel should have been turned slightly beyond its proper position for indicating "3", the engagement of the pin 86 in the end of the slot 85 will push the bar 83 upwardly until the proper indication is displayed. In Fig. 13 the parts are shown in full lines in the position last described.

The printing mechanism, shown particularly in Fig. 6, consists of type carriers 96, there being one of said type carriers for each of the segments 22, hereinbefore referred to. Each of these segments has a forwardly extending arm 97 which engages with its respective type carrier and draws the same rearwardly with it to set the type carrier, said segments being operated by the pinions 24. The type carriers 96 are journaled on the shaft 18 alongside the segments 22 and above said shaft, the arm of each of the type carriers is expanded into a plate 98 having a series of ratchet teeth 99 arranged thereon in a line concentric with the shaft. It will be understood that the segments 22 swing back and forth with the operations of the keys associated therewith. The type carriers, however, are designed to remain in their set positions between operations of the machine; and, for the purpose of holding the type carriers in their set positions, I employ pawls 100 having hooks for engaging with the ratchet teeth 99. The pawls are journaled on the rod 74, and they are connected so as to move together by a rod 101. The type carriers are moved to their zero positions when released from the pawls 100 by springs 102, and the pawls are pressed toward their engaging positions by a spring 103 which connect the rod 101 with a stationary rod 104.

As appears from Figs. 7 and 8, the coupler shaft 30 carries, just outside the frame piece 2, a segment 105 said segment meshing with a small pinion 106 that is rigidly connected with a gear 107, said pinion and gear being journaled on a stud projecting from the machine frame. With the gear 107 meshes a pinion 108 that is secured to a shaft 109 that operates the arm 110 of the printing platen. The printer shown herein is substantially identical with that shown in the patent to Henry S. Hallwood No. 845,634, and it is not deemed necessary to describe the same further than to say that the recording strip is drawn from a spool 111, is suitably guided between the type carriers and the platen and is wound on a receiving spool 112.

At the beginning of the depression of a key, the type carriers 98 should be released so as to permit them to be reset. For this purpose, I connect with the gear 107, see Figs. 7 and 8, a cam plate 113, to which is connected a by-pass pawl 114. The pin or rod 101 that connects the pawls 100 has a link 115 pivoted thereto, said link extending downwardly and forwardly and being connected near its lower end with a crank arm 116 that is journaled on the coupler shaft 30. On its lower end, the link 115 carries an anti-friction roller 117. As appears from Fig. 8, the cam plate 113 is provided with a curved outer edge 118 upon the outer face of which the roller 117 is adapted to travel. Upon the depression of a key and the consequent oscillation of the coupler shaft 30 and of the segment 105, the cam plate 113 is swung rearwardly, or to the right as seen in Fig. 7, with the result that the pawl 114 forces its way under the roller 117 and lifts the link 115 and the pawls 100, thereby releasing said pawls from the type carriers so that the latter may be returned to their normal positions under the stress of their springs 102. The roller travels over the pawl 114 to the outer rim of the flange 118 of the cam plate, upon which flange it rolls until the plate 113 passes entirely beyond said roller, whereupon the spring 103 draws the link 115 downwardly and the roller passes below the flange 118, the plate 113 returning to its normal position with the roller 117 beneath the flange. As the plate 113 approaches its normal position, the roller 117 passes beneath the pawl 114, lifts the latter and then permits it to drop back to normal position again after it has passed beyond the roller.

By the construction thus described, the printing segments are released so that they may be returned to their normal positions at the beginning of the depression of a key, and they remain out of control of the pawl 100 until the key has substantially reached the end of its downward stroke and the type carriers have been set, when the pawl drops into locking engagement with the ratchet teeth 99, remaining in such engagement until the next operation of the machine.

I shall now describe the shutters or flashes for the indicator wheels, and the mechanism for operating the same, directing attention particularly to Fig. 14. On the rod or shaft 18, and preferably near the center of the machine, I journal a lever 119, said lever extending both above and below said shaft. The lower end of the lever projects into the path of a cam or nose 120 on the key-coupler, and a spring 121 holds the lever in contact with said cam. The upper part of the lever extends toward the shaft 64 of the indicator wheels, the same being bent around said shaft so as to extend beyond the latter and still lie normally in the plane connecting the shafts 18 and 64. The shutters or flashes are shown at 122 and 123, the former concealing the indications from the front, and the latter concealing the indications from the rear. These shutters are in the form of yokes, the side members of which are pivoted upon the shaft 64. One of the arms of the shutter 122 has an extension below the shaft 164 from which extension projects a pin 124, said pin projecting into an elongated slot 125 in the lever 119. Similarly, the corresponding arm of the shutter 123 has an upward extension above the shaft 164 from which projects a pin 126 that extends into an elongated slot 127 in the upper end of said lever. With this kind of connection, a rearward movement of the upper end of lever 119 results in simultaneously rocking the shutters 122 and 123 downwardly into positions for concealing the indications.

In Fig. 14 the key-coupler is shown slightly moved from its normal position, as the key 8 is slightly depressed. The cam 120, on the coupler has therefore, pushed the lower end of the lever 119 forwardly and has thrown the upper end of said lever rearwardly so that the shutters are moved part way toward their concealing positions. The continued depression of the key causes the cam 120 to rock the lever still farther until the end of said lever contacts with the curved part 128 of said cam, said part being substantially concentric to the coupler shaft. When this part begins to connect with the lever 119 the latter will not be moved farther. Upon the release of the key and the backward movement of the coupler, the lever rides off said part 128 and the lever 119 is returned to normal position by the spring 121, such movement lifting the shutters and exposing the indication that has been made by the depression of the key. It will be seen, therefore, that, at substantially the beginning of the operation of the key, the indicator wheels are concealed, and that they remain concealed until the key is returned to substantially its normal position.

While I have shown and described certain forms of mechanism embodying my invention, such forms are not the only ones in which the invention may be embodied, and I desire it to be understood that the following claims are not intended to be limited to the details shown and described any further than is rendered necessary by the specific terms therein employed.

Having thus described my invention, what I claim is:

1. In a cash register, the combination with a bank of keys arranged in denominational series, of a key-coupler coöperating with all of said keys and movable with the same throughout their entire strokes, of a graduated yoke for each denominational order of the keys, said yokes being moved distances dependent upon the particular keys operated, an oscillatory indicator for each yoke, connections between said indicators and the key-coupler adapted for positively turning the indicators in one direction, and connections between the indicators and the corresponding yokes, said latter connections being adapted for positively turning the indicators in the opposite direction.

2. In a cash register, the combination with a bank of keys arranged in denominational series, of a key-coupler coöperating with each of said keys, a graduated yoke for each denominational series and movable differential distances dependent upon the key in the series that is operated, an oscillatory indicator for each series of keys, a pinion connected with each indicator, a rocking toothed segment for and engaging with each of said pinions for turning the indicators, means connecting the toothed segments with the key-coupler for turning the indicators from higher to lower indications and means connecting the toothed segments with their corresponding graduated yokes for turning the indicators from lower to higher indications.

3. In a cash register, the combination with a series of keys, of a rocking member turned when any key is operated, a graduated yoke coöperating with each of said keys and movable thereby distances dependent upon the particular key operated, a pivoted segment, means connecting said yoke with the segment, an oscillatory indicator, a toothed arm gearing with said indicator, and a resetting plate connecting said arm with the pivoted segment, said resetting plate projecting into position for engagement by the said rocking member whereby, upon the operation of a key, the said member may engage the resetting plate and turn the toothed arm for resetting the indicator.

4. In a cash register, the combination with a series of keys, of a rocking member turned when any key is operated, differential mechanism coöperating with each of said keys and movable thereby distances dependent upon the particular key operated, a pivoted member, means connecting said differential mechanism with the pivoted member, an oscillatory indicator, a toothed element gearing with said indicator and a resetting plate connecting said element with the pivoted member, said resetting plate projecting into position for engagement by the said rocking member whereby, upon the operation of a key, the said rocking member may engage the resetting plate and move the toothed element for resetting the indicator.

5. In a cash register, the combination with a series of keys, of a key-coupler coöperating therewith, a graduated yoke also coöperating with said keys and movable different distances thereby, a rod, a rocking member pivoted on said rod, means connecting the member with the said yoke, an oscillatory indicator, a pinion on the indicator, a toothed member meshing with the indicator pinion, a resetting plate connected with both the toothed member and the rocking member, and means on said resetting plate extending into position for engagement by the key-coupler, as and for the purpose specified.

6. In a cash register, the combination with a series of keys, of a key-coupler coöperating therewith, a graduated yoke also coöperating with said keys and movable different distances thereby, a rod, a segment pivoted on said rod, means connecting the segment with the said yoke, an oscillatory indicator, a pinion on the indicator, a toothed member also pivoted on the said rod and having its teeth meshing with the indicator pinion, a resetting plate pivoted to said toothed member, said plate having a slot therein, a pin projecting from the pivoted segment into said slot, and a projection on said resetting plate extending into position for engagement by the key-coupler, as and for the purpose specified.

7. In a cash register, the combination with a bank of keys arranged in denominational series, of a key-coupler common to said keys, said coupler being turned by the keys throughout the limit of their movements, a graduated yoke for and removable by the keys of each series, a rod, a segment for each of said yokes pivoted upon said rod, means connecting each segment with its respective yoke, a series of oscillatory indicators, one for each of said series, a pinion on each indicator, a series of toothed members pivoted on said rod, there being one of said members for each pinion, a resetting plate pivoted to each toothed member, each of said resetting plates being provided with an inclined slot therein, a pin projecting from each of the pivoted segments into the slot of the corresponding resetting plate, a projection on each of the resetting plates, and means on the key-coupler for engaging said projections, as and for the purpose specified.

8. In a cash register, the combination with a bank of keys arranged in denominational series, of a key-coupler common to said keys, said coupler being turned by the keys throughout the limit of their movements, a graduated yoke for and movable by the keys of each series, a rod, a segment for each of said yokes pivoted upon said rod, means connecting each segment with its respective yoke, a series of oscillatory indicators, one for each of said series, a pinion on each indicator, a series of toothed members pivoted on said rod, there being one of said members for each pinion, a resetting plate pivoted to each toothed member, each of said resetting plates being provided with an inclined slot therein, a pin projecting from each of the pivoted segments into the slot of the corresponding resetting plate, a nose on each of the resetting plates, and a bar on the key-coupler for engaging said noses, as and for the purpose specified.

9. In a cash register, the combination with a bank of keys arranged in denominational series, of a key-coupler coöperating with said keys, a graduated yoke for each series of keys, a rod, a series of segments pivoted on said rod, means connecting each segment with its respective graduated yoke, an oscillatory indicator for each series of keys, a pinion on each indicator, a toothed member for each indicator wheel pivoted on said rod adjacent the corresponding pivoted segment, a projection on each of said toothed members extending into position for engagement by the corresponding segment, a resetting plate for and pivoted to each of said toothed members, each of said plates being provided with an elongated slot, a pin projecting from the corresponding segment into the slot of the respective resetting plate, a projection on each of the resetting plates, said projections being adapted to extend into position for engagement by the key-coupler, a detent pawl for each indicator wheel, and means connecting said detent pawls with the corresponding toothed member, as and for the purpose specified.

10. In a cash register, the combination with a bank of keys arranged in denominational series, of a key-coupler coöperating with said keys, a graduated yoke for each series of keys, a rod, a series of segments pivoted on said rod, means connecting each segment with its respective graduated yoke, a type carrier connected with each of said segments, an oscillatory indicator for each series of keys, a pinion on each indicator, a toothed member for each indicator wheel pivoted on said rod adjacent the corresponding pivoted segment, a projection on each of said toothed members extending into position for engagement by the corresponding segment, a resetting plate for and pivoted to each of said toothed members, each of said plates being provided with an elongated slot, a pin projecting from the corresponding segment into the slot of the resetting plate, a nose on each of the resetting plates, a bar on the key-coupler, a detent pawl for each indicator wheel, and means connecting said detent pawl with the corresponding toothed member, as and for the purpose specified.

11. In a cash register, the combination with a stationary frame, of a series of keys, of a registering mechanism, a member movable by the said keys differentially for operating the registering mechanism, means for throwing the registering mechanism into and out of operative engagement with the said member, a latch connected with said means, transferring devices, and means for permitting said latch to engage said frame for positively holding the registering mechanism against movement toward the said member during the transferring operation.

12. In a cash register, the combination with a stationary frame, of a series of key levers, a pivoted frame, registering mechanism mounted in said pivoted frame, a member operated differential distances by the keys, means for swinging said pivoted frame to throw the registering mechanism into and out of operation with respect to the said member, a latch on said pivoted frame, transferring devices for the registering mechanism, and means for operating said devices while the registering mechanism is out of engagement with its said member, said means being adapted to permit the latch to engage the stationary frame during the transferring operation.

13. In a cash register, the combination with a series of key levers, of a pivoted frame, a registering mechanism mounted in said frame, a rocking segment, connections between said rocking segment and the said keys, means for rocking said frame so as to throw the registering mechanism into engagement with the said segment, means for drawing the registering mechanism out of engagement with the segment, transferring devices for the registering mechanism, means for operating the transferring devices while the registering mechanism is out of engagement with the segment, and a latch pivoted to said frame and engaging a stationary part of the cash register for holding said frame against movement during the transferring operation.

14. In a cash register, the combination with a series of key levers, of a pivoted frame, a registering mechanism mounted in said frame, a rocking segment, connections between said rocking segment and the said keys, means for rocking said frame so as to throw the registering mechanism into engagement with the said segment, means for drawing the registering mechanism out of engagement with the segment, transferring devices for the registering mechanism, a shaft, cams on said shaft for operating the transferring devices while the registering mechanism is out of operative position, a lug on said shaft, and a latch pivoted to said frame and engaging a stationary part of the cash register for holding said frame against movement during the transferring operation, said lug being so positioned as to disengage the latch after the transfer has been effected.

15. In a cash register and recorder, the combination with a series of keys, of a segment moved differential distances upon the depression of the keys in the series, a type carrier adjacent said segment and movable therewith in one direction, a series of ratchet teeth on said type carrier, a detent pawl for engaging said ratchet teeth and for holding the type carrier in its set position, a key-coupler, a rocking plate, gearing connecting said coupler with said plate for rocking the latter, and means connecting said plate and the pawl for releasing the latter from its ratchet teeth whereby the type carrier may return to its normal positions.

16. In a cash register and recorder, the combination with a bank of keys arranged in order series, of a segment for each series and movable differential distances upon the depression of keys in the corresponding series, a type carrier for and adjacent each segment and movable therewith in one direction, a series of ratchet teeth on each of said type carriers, a series of connected detent pawls for engaging said ratchet teeth and for holding the type carriers in their set positions, a key-coupler, a rocking plate, gearing connecting said coupler with said plate for rocking the latter, and means connecting said plate and the said connected pawls for releasing the latter from their ratchet teeth whereby the type carriers may simultaneously return to their normal positions.

17. In a cash register and recorder, the combination with a bank of keys arranged in denominational series, a key-coupler coöperating with each of said keys, a pivoted segment for each series of keys, said segments being moved distances dependent upon the keys that are operated in their respective series, a pivoted type carrier for each of said segments, said type carriers being moved to their set positions by the said segments, ratchet teeth on each of said type carriers, a series of pawls engaging the ratchet teeth on the different type carriers, a movable plate, gearing connecting said plate with the key-coupler, and means connecting said plate with said pawls, as and for the purpose specified.

18. In a cash register and recorder, the combination with a bank of keys arranged in denominational series, a key-coupler coöperating with each of said keys, a pivoted segment for each series of keys, said segments being moved distances dependent upon the keys that are operated in their respective series, a pivoted type carrier for each of said segments, said type carriers being journaled coaxially with their segments and being moved to their set position by the said segments, ratchet teeth on each of said type carriers, a series of connected pawls engaging the ratchet teeth on the different type carriers, a swinging plate, gearing connecting said plate with the key-coupler, and means connecting said plate with said pawls, as and for the purpose specified.

19. In a cash register, the combination with a bank of keys arranged in denominational series, of a key-coupler operated by each of said keys, a series of pivoted segments, means connecting each of said segments with the keys in its respective series, whereby the segments are turned distances dependent upon the values of the keys operated, a series of type carriers, there being a type carrier for each segment, means for moving the type carriers with their segments in one direction, a spring for returning the type carriers to their normal positions, a series of ratchet teeth on each of the type carriers, pawls engaging with said ratchet teeth for holding the type carriers in their set positions while their segments return to normal position, a rocking plate, gearing connecting said plate with the key-coupler, a by-pass pawl on said plate, and a link connected with said pawls and extending into the path of said by-pass whereby upon the depression of a key, the by-pass lifts the said link and the detent pawls to release the type carriers and permit them to return to normal position.

20. In a cash register, the combination with a bank of keys arranged in denominational series, of a key-coupler operated by each of said keys, a series of pivoted segments, means connecting each of said segments with the keys in its respective series, whereby the segments are turned distances dependent upon the values of the keys operated, a series of type carriers, there being a type carrier for each segment, means for moving the type carriers with their segments in one direction, a spring for returning the type carriers to their normal positions, a series of ratchet teeth on each of the type carriers, pawls engaging with said ratchet teeth for holding the type carriers in their set positions, while their segments return to normal position, a pin connecting said pawls together, a rocking plate, gearing connecting said plate with the key-coupler, a by-pass pawl on said plate, and a link connected with said pin and extending into the path of said by-pass pawl whereby, upon the depression of a key, the by-pass pawl lifts the said link and the detent pawls to release the type carriers and to permit them to return to normal position.

21. In a cash register, the combination with a series of keys, of a rocking member coöperating with and movable by each of said keys, an oscillatory indicator, connections between said keys and the said indicator, a shutter for concealing the indicator, a pivoted lever connected with said shutter, a spring for holding the lever in normal position with the indicator exposed, and a cam on the rocking member for rocking the said lever and for thereby moving the shutter to its concealing position, said cam remaining in contact with the lever and thereby holding the shutter in its moved position until the said member returns to its normal position.

22. In a cash register, the combination with a bank of keys arranged in denominational series, of a key-coupler coöperating with each of said keys, oscillatory indicators exhibiting both at the front and at the rear of the register, connections between said keys and the said indicators, a pair of shutters for concealing the indicators both at the front and at the rear, a pivoted lever connected with said shutters, a spring for holding the lever in normal position with the indicators exposed, and a cam on the key-coupler for rocking the said lever and for thereby moving the shutters to their concealing positions, said cam remaining in contact with the lever and thereby positively holding the shutters in their moved positions until the coupler returns to its normal position.

In testimony whereof, I hereunto affix my signature in the presence of two witnesses.

GEORGE M. GRIDLEY.

Witnesses:
R. M. LUCAS,
F. H. GAME.